United States Patent
Ryu et al.

(10) Patent No.: US 9,013,068 B2
(45) Date of Patent: Apr. 21, 2015

(54) WIRELESS POWER TRANSMISSION APPARATUS USING NEAR FIELD FOCUSING

(75) Inventors: Young Ho Ryu, Yongin-si (KR); Eun Seok Park, Suwon-si (KR); Sang Wook Kwon, Seongnam-si (KR); Young Tack Hong, Seongnam-si (KR); Nam Yun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 749 days.

(21) Appl. No.: 12/978,553

(22) Filed: Dec. 25, 2010

(65) Prior Publication Data

US 2011/0156492 A1 Jun. 30, 2011

(30) Foreign Application Priority Data

Dec. 30, 2009 (KR) ........................ 10-2009-0133596

(51) Int. Cl.
  *H01F 27/42* (2006.01)
  *H02J 17/00* (2006.01)

(52) U.S. Cl.
  CPC ...................................... *H02J 17/00* (2013.01)

(58) Field of Classification Search
  USPC ......................................................... 307/104
  See application file for complete search history.

(56) References Cited

U.S. PATENT DOCUMENTS

| | | | |
|---|---|---|---|
| 6,512,494 B1 * | 1/2003 | Diaz et al. | 343/909 |
| 6,690,327 B2 * | 2/2004 | McKinzie, III et al. | 343/700 MS |
| 6,859,114 B2 * | 2/2005 | Eleftheriades et al. | 333/156 |
| 6,985,118 B2 * | 1/2006 | Zarro et al. | 343/756 |
| 7,151,506 B2 * | 12/2006 | Knowles et al. | 343/909 |
| 7,154,451 B1 * | 12/2006 | Sievenpiper | 343/909 |
| 7,190,315 B2 * | 3/2007 | Waltho | 343/705 |
| 7,190,325 B2 * | 3/2007 | Nagy | 343/909 |
| 7,456,803 B1 | 11/2008 | Sievenpiper | |
| 7,592,957 B2 * | 9/2009 | Achour et al. | 343/700 MS |
| 7,593,696 B2 | 9/2009 | Fischer | |
| 7,639,207 B2 * | 12/2009 | Sievenpiper et al. | 343/909 |
| 7,764,232 B2 * | 7/2010 | Achour et al. | 343/700 MS |
| 8,003,965 B2 * | 8/2011 | Grbic et al. | 250/505.1 |
| RE43,699 E * | 10/2012 | Anderson et al. | 343/701 |
| 8,400,017 B2 * | 3/2013 | Kurs et al. | 307/104 |

(Continued)

FOREIGN PATENT DOCUMENTS

| | | |
|---|---|---|
| CN | 101431259 A | 5/2009 |
| JP | 2004-64780 A | 2/2004 |

(Continued)

OTHER PUBLICATIONS

Chaimool et al., "Mu-near-zero metasurface for microstrip-fed slot antennas", Apr. 20, 2013, Springer-Verlag Berlin Heidelberg, Applied Physics A—Material Science & Processing, pp. 669-675.*

(Continued)

*Primary Examiner* — Daniel Cavallari
(74) *Attorney, Agent, or Firm* — NSIP Law

(57) ABSTRACT

A wireless power transmission apparatus using near field focusing is provided. The wireless power transmission apparatus may include a source unit including a source resonator that transmits power wirelessly to a target apparatus, and a near field focusing unit to focus a near field of a magnetic field radiated in an omni-direction from the source resonator onto the target apparatus.

14 Claims, 15 Drawing Sheets

(56) References Cited

U.S. PATENT DOCUMENTS

| | | | |
|---|---|---|---|
| 8,884,834 B1* | 11/2014 | Paschen | 343/805 |
| 2004/0227682 A1* | 11/2004 | Anderson | 343/742 |
| 2006/0028385 A1 | 2/2006 | Davis et al. | |
| 2008/0204164 A1 | 8/2008 | Eleftheriades | |
| 2009/0135086 A1 | 5/2009 | Fuller et al. | |
| 2009/0201572 A1 | 8/2009 | Yonak | |
| 2009/0303154 A1 | 12/2009 | Grbic et al. | |
| 2010/0311363 A1* | 12/2010 | Rofougaran et al. | 455/121 |
| 2011/0084782 A1* | 4/2011 | Kanno | 333/202 |

FOREIGN PATENT DOCUMENTS

| | | |
|---|---|---|
| JP | 2004-159456 A | 6/2004 |
| JP | 2005-110273 A | 4/2005 |
| JP | 2009-273213 A | 11/2009 |
| JP | 2011-45045 A | 3/2011 |
| KR | 10-2009-0038027 A | 4/2009 |
| WO | WO 2009/065099 A2 | 5/2009 |
| WO | WO 2009/131780 | 10/2009 |

OTHER PUBLICATIONS

McSpadden, J.O.; Lu Fan; Kai Chang, "Design and experiments of a high-conversion-efficiency 5.8-GHz rectenna," Microwave Theory and Techniques, IEEE Transactions on , vol. 46, No. 12, pp. 2053,2060, Dec. 1998.*

Ziolkowski, Richard W. Metamaterial-Based Patch Antennas and Adaptive Rectifying Circuits for High Power Rectenna Applications. Arizona Univ Tucson Dept of Electricaland Computer Engineering, 2005.*

Yu-Jiun Ren; Kai Chang, "New 5.8-GHz circularly polarized retrodirective rectenna arrays for wireless power transmission," Microwave Theory and Techniques, IEEE Transactions on , vol. 54, No. 7, pp. 2970,2976, Jul. 2006.*

McSpadden, J.O.; Mankins, J.C., "Space solar power programs and microwave wireless power transmission technology," Microwave Magazine, IEEE , vol. 3, No. 4, pp. 46,57, Dec. 2002.*

Youn, Dong-Gi; Kwan-Ho Kim; Young-chul Rhee; Kim, Sang-Tae; Shin, Chull-Chai, "Experimental Development of 2.45GHz Rectenna using FSS and Dual-Polarization," Microwave Conference, 2000. 30th European , vol., No., pp. 1,4, Oct. 2000.*

International Search Report (Form PCT/ISA/210) issued on Aug. 24, 2010, in counterpart International Application No. PCT/KR2010/009541 (3 pages, in English).

Chinese Office Action issued on May 6, 2014 in counterpart of Chinese Application No. 201080060375.7 (6 pages in Chinese).

Japanese Office Action issued on Apr. 30, 2014 in counterpart of Japanese Application No. 2012-547029 (3 pages in Japanese).

* cited by examiner

WIRELESS POWER TRANSMISSION APPARATUS USING NEAR FIELD FOCUSING

CROSS-REFERENCE TO RELATED APPLICATION(S)

This application claims the benefit under 35 U.S.C. §119(a) of Korean Patent Application No. 10-2009-0133596, filed on Dec. 30, 2009, in the Korean Intellectual Property Office, the entire disclosure of which is incorporated herein by reference for all purposes.

BACKGROUND

1. Field

The following description relates to a wireless power transmission system, and more particularly, to a wireless power transmission apparatus that may control the direction of a magnetic field generated by a resonator using near field focusing.

2. Description of Related Art

With the development of Information Technology (IT), the amount and the variety of portable electronic devices has increased. Battery performance of a corresponding portable electronic device is an important issue. In addition to the portable electronic devices, home electronic appliances have a function of wirelessly transmitting data, however, conventionally the electronic appliances are supplied with power over a power line.

Currently, researches are being conducted on wireless power transmission technologies that may wirelessly supply power. Due to characteristics of a wireless power transmission environment, peripheral apparatuses may be influenced by a magnetic field of a wireless power transmission apparatus.

SUMMARY

In one general aspect, there is provided a wireless power transmission apparatus, comprising a source unit comprising a source resonator to transmit wireless power to a target apparatus, and a near field focusing unit to focus a near field of a magnetic field onto the target apparatus, wherein the magnetic field is radiated in an omni-direction from the source resonator.

The near field focusing unit may comprise a meta-superstrate that has a negative refractive index.

The near field focusing unit may comprise a Mu Near Zero (MNZ) superstrate or Epsilon Near Zero (ENZ) superstrate that has a beam forming characteristic.

The wireless power transmission apparatus may further comprise a near field controller that has a High Impedance Surface (HIS) characteristic.

The near field controller may be designed such that a magnetic field of the source unit has an in-phase characteristic.

The near field controller may comprise a side focusing unit to control a direction of a side magnetic field of the source unit, and a rear surface focusing unit to control a direction of a rear surface magnetic field of the source unit.

In another aspect, there is provided a source resonator for increasing wireless energy transmission efficiency, the source resonator comprising a resonator for wirelessly transmitting a power signal to a target resonator, and a near field focusing unit that focuses a near field of a magnetic field in a direction of the target resonator such that incident waves of the power signal that are not traveling in the direction of the target resonator are redirected towards the target resonator.

The near field focusing unit may comprise a meta-superstrate that has a negative refractive index that enables the incident waves to be redirected towards the target resonator.

The near field focusing unit may comprise a Mu Near Zero (MNZ) superstrate or Epsilon Near Zero (ENZ) superstrate that has a beam forming characteristic that enables the incident waves to be redirected towards the target resonator.

The source resonator may further comprise a near field controller that is designed such that the magnetic field of the source unit has an in-phase characteristic.

The near field controller may comprise a side focusing unit to control a direction of a side magnetic field of the source unit, and a rear surface focusing unit to control a direction of a rear surface magnetic field of the source unit.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

Figure 1:
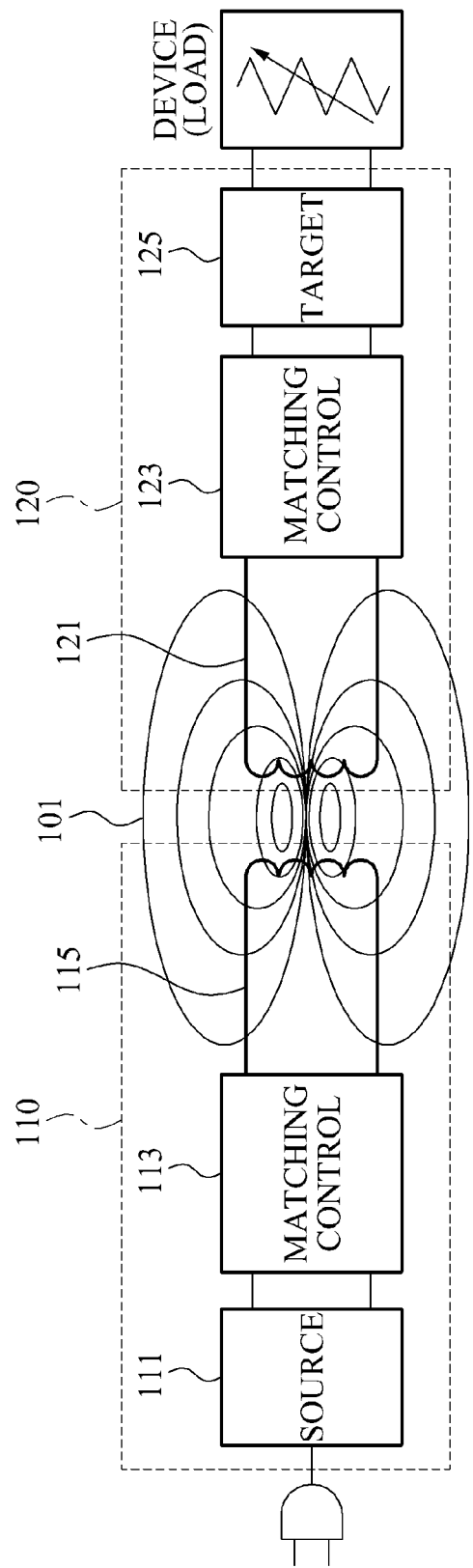
FIG. 1 is a diagram illustrating an example of a wireless power transmission system.

As described herein, for example, the source or transmitter may be, or may be included in, a terminal, such as a mobile terminal, a personal computer, a personal digital assistant (PDA), an MP3 player, and the like. As another example, the target or receiver described herein may be, or may be included in, a terminal, such as a mobile terminal, a personal computer, a personal digital assistant (PDA), an MP3 player, and the like. As another example, the transmitter and/or the receiver may be a separate individual unit. FIG. 1 illustrates an example of a wireless power transmission system.

As described herein, wireless power transmitted using the wireless power transmission system may be referred to as resonance power.

Referring to FIG. 1, the wireless power transmission system includes a source-target structure including a source and a target. In this example, the wireless power transmission system includes a resonance power transmitter 110 corresponding to the source and a resonance power receiver 120 corresponding to the target.

The resonance power transmitter 110 includes a source unit 111 and a source resonator 115. The source unit 111 may receive energy from an external voltage supplier to generate a resonance power. The resonance power transmitter 110 may further include a matching control 113 to perform resonance frequency or impedance matching.

For example, the source unit 111 may include an alternating current (AC)-to-AC (AC/AC) converter, an AC-to-direct current (DC) (AC/DC) converter, a DC-to-AC (DC/AC) inverter, and the like. The AC/AC converter may adjust, to a desired level, a signal level of an AC signal input from an external device. The AC/DC converter may output a DC voltage at a predetermined level by rectifying an AC signal output from the AC/AC converter. The DC/AC inverter may generate an AC signal in a band of hertz (HZ), for example, a few megahertz (MHz), tens of MHz, and the like, by quickly switching a DC voltage output from the AC/DC converter.

The matching control 113 may set at least one of a resonance bandwidth of the source resonator 115 and an impedance matching frequency of the source resonator 115. Although not illustrated in FIG. 1, the matching control 113 may include at least one of a source resonance bandwidth setting unit and a source matching frequency setting unit. The source resonance bandwidth setting unit may set the resonance bandwidth of the source resonator 115. The source matching frequency setting unit may set the impedance matching frequency of the source resonator 115. For example, a Q-factor of the source resonator 115 may be determined based on the setting of the resonance bandwidth of the source resonator 115 and/or the setting of the impedance matching frequency of the source resonator 115.

The source resonator 115 may transfer electromagnetic energy to a target resonator 121. For example, the source resonator 115 may transfer resonance power to the resonance power receiver 120 through magnetic coupling 101 with the target resonator 121. The source resonator 115 may resonate within the set resonance bandwidth.

The resonance power receiver 120 includes the target resonator 121, a matching control 123 to perform resonance frequency or impedance matching, and a target unit 125 to transfer the received resonance power to a load.

The target resonator 121 may receive the electromagnetic energy from the source resonator 115. The target resonator 121 may resonate within the set resonance bandwidth.

The matching control 123 may set at least one of a resonance bandwidth of the target resonator 121 and an impedance matching frequency of the target resonator 121. Although not illustrated in FIG. 1, the matching control 123 may include at least one of a target resonance bandwidth setting unit and a target matching frequency setting unit. The target resonance bandwidth setting unit may set the resonance bandwidth of the target resonator 121. The target matching frequency setting unit may set the impedance matching frequency of the target resonator 121. For example, a Q-factor of the target resonator 121 may be determined based on the setting of the resonance bandwidth of the target resonator 121 and/or the setting of the impedance matching frequency of the target resonator 121.

The target unit 125 may transfer the received resonance power to the load. For example, the target unit 125 may include an AC/DC converter and a DC/DC converter. The AC/DC converter may generate a DC voltage by rectifying an AC signal transmitted from the source resonator 115 to the target resonator 121. The DC/DC converter may supply a rated voltage to a device or the load by adjusting a voltage level of the DC voltage.

For example, the source resonator 115 and the target resonator 121 may be configured in a helix coil structured resonator, a spiral coil structured resonator, a meta-structured resonator, and the like.

Referring to FIG. 1, a process of controlling the Q-factor may include setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. For example, the resonance bandwidth of the source resonator 115 may be set wider or narrower than the resonance bandwidth of the target resonator 121. For example, an unbalanced relationship between a bandwidth (BW)-factor of the source resonator 115 and a BW-factor of the target resonator 121 may be maintained by setting the resonance bandwidth of the source resonator 115 to be wider or narrower than the resonance bandwidth of the target resonator 121.

In a wireless power transmission system employing a resonance scheme, the resonance bandwidth may be an important factor. When the Q-factor considering all of a change in a distance between the source resonator 115 and the target resonator 121, a change in the resonance impedance, impedance mismatching, a reflected signal, and the like, is Qt, Qt may have an inverse-proportional relationship with the resonance bandwidth, as given by Equation 1.

$$\frac{\Delta f}{f_0} = \frac{1}{Qt}$$
$$= \Gamma_{S,D} + \frac{1}{BW_S} + \frac{1}{BW_D}$$

[Equation 1]

In Equation 1, $f_0$ denotes a central frequency, $\Delta f$ denotes a change in a bandwidth, $\Gamma_{S,D}$ denotes a reflection loss between the source resonator 115 and the target resonator 121, $BW_S$ denotes the resonance bandwidth of the source resonator 115, and $BW_D$ denotes the resonance bandwidth of the target resonator 121. For example, the BW-factor may indicate either $1/BW_S$ or $1/BW_D$.

Due to an external effect, impedance mismatching between the source resonator 115 and the target resonator 121 may occur. For example, a change in the distance between the source resonator 115 and the target resonator 121, a change in a location of at least one of the source resonator 115 and the target resonator 121, and the like, may cause impedance mismatching between the source resonator 115 and the target resonator 121 to occur. The impedance mismatching may be a direct cause in decreasing an efficiency of power transfer. When a reflected wave corresponding to a transmission signal that is partially reflected by the source and returned towards the target is detected, the matching control 113 may determine that impedance mismatching has occurred, and may perform impedance matching. For example, the matching control 113 may change a resonance frequency by detecting a resonance point through a waveform analysis of the reflected wave. The matching control 113 may determine, as the resonance frequency, a frequency that has a minimum amplitude in the waveform of the reflected wave.

The source resonator 115 and the target resonator 121 of FIG. 1 may be configured as shown in the examples of FIGS. 7 through 12.

Figure 2:
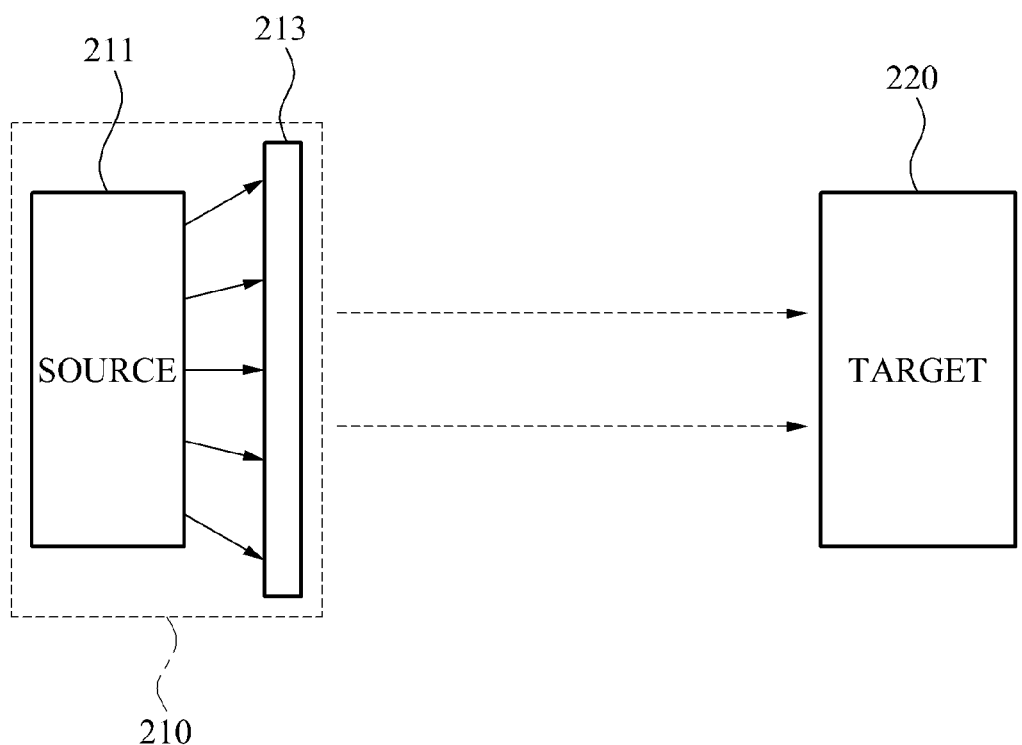
FIG. 2 is a diagram illustrating an example of a wireless power transmission apparatus.

FIG. 2 illustrates a wireless power transmission apparatus.

Referring to FIG. 2, wireless power transmission apparatus 210 includes a source unit 211 and a near field focusing unit 213.

For example, the source unit 211 may include a source resonator to transmit power wirelessly to a target apparatus 220. The source unit 211 may further include a means for measuring a location or a direction of the target apparatus 220. For example, the means for measuring the location or the direction of the target apparatus 220 may be implemented as a communication module configured to receive location information via a communication channel with the target apparatus 220, or as a means for detecting a direction that is set in advance for each target apparatus 220.

Figure 3:
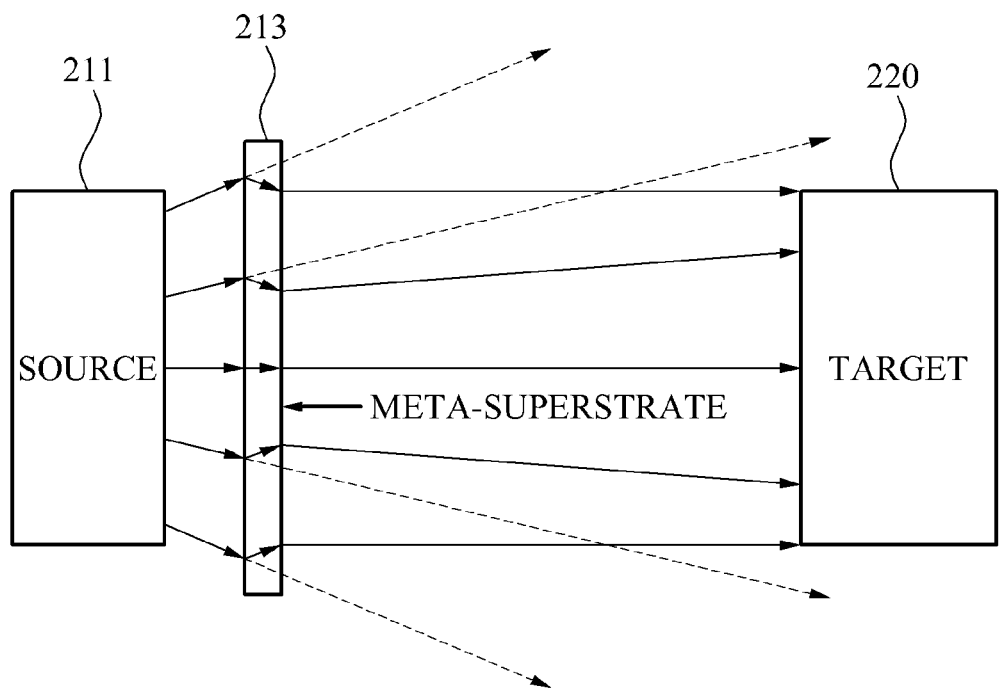
FIGS. 3 through 5 are diagrams illustrating examples of a near field focusing unit.

The near field focusing unit 213 may focus a near field of a magnetic field onto the target apparatus 220. For example, the magnetic field may be radiated in an omni-direction of the source resonator. As shown in FIG. 3, the near field focusing unit 213 may include, for example, a meta-superstrate having a negative refractive index. The meta-superstrate that has a negative refractive index may enable incident waves to be transmitted in a direction indicated by solid arrows of FIG. 3. Also shown is the direction that a general medium is transmitted as indicated by dotted arrows of FIG. 3. Accordingly, the near field of the magnetic field may be focused onto the target apparatus 120 by the meta-superstrate that has the negative refractive index.

Figure 4:
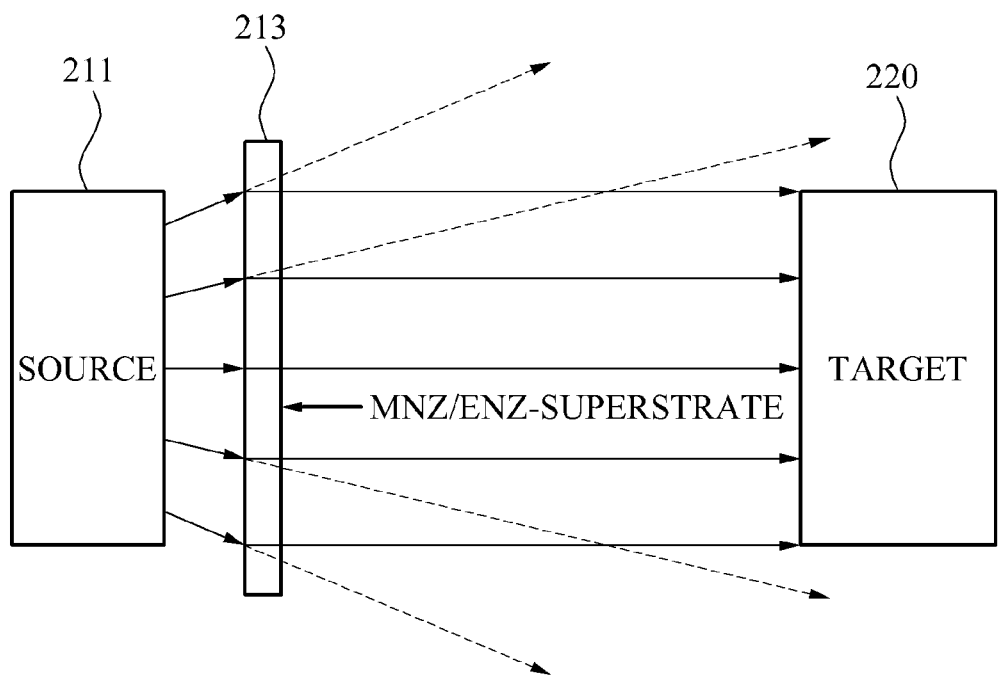
Figure 5:
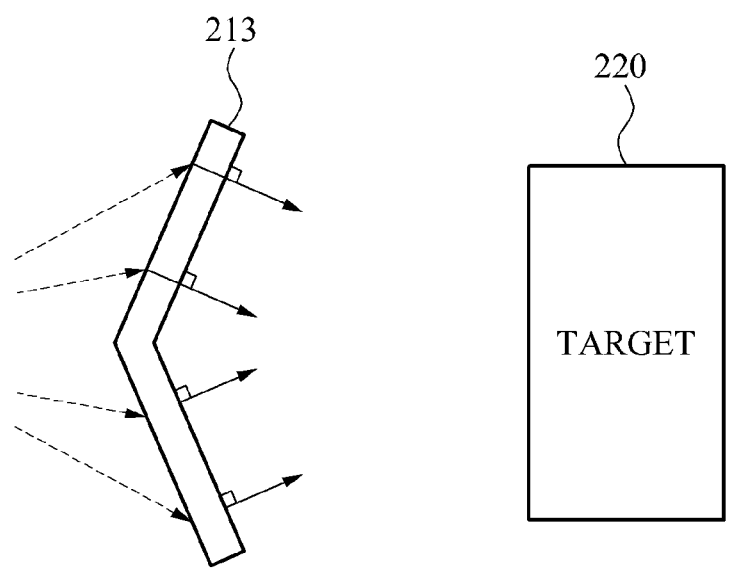

As shown in FIG. 4, the near field focusing unit 213 may include, for example, a Mµ Near Zero (MNZ) superstrate or Epsilon Near Zero (ENZ) superstrate that has a beam forming characteristic. For example, the MNZ superstrate or the ENZ superstrate may enable incident waves to be transmitted in a direction that is approximately perpendicular to a transmission plane, as indicated by solid arrows of FIG. 4. The incident waves may be transmitted regardless of an incidence angle of the incident waves, in a different manner from a general medium transmitted as indicated by dotted arrows of FIG. 4. For example, the near field focusing unit 213 may be bent toward the target apparatus 220, as shown in FIG. 5. In this example, a near field may be formed in a direction that is approximately perpendicular to a transmission plane of the near field focusing unit 213.

For example, the near field focusing unit 213 may focus a magnetic field radiated in an undesired direction during wireless power transmission, onto the target apparatus 220. Accordingly, it is possible to prevent interference due to radiated energy from affecting peripheral apparatuses. In addition, it is possible to increase an energy transmission efficiency by focusing, to the target apparatus 220, the near field of the magnetic field radiated in the omni-direction of the source resonator.

Figure 6:
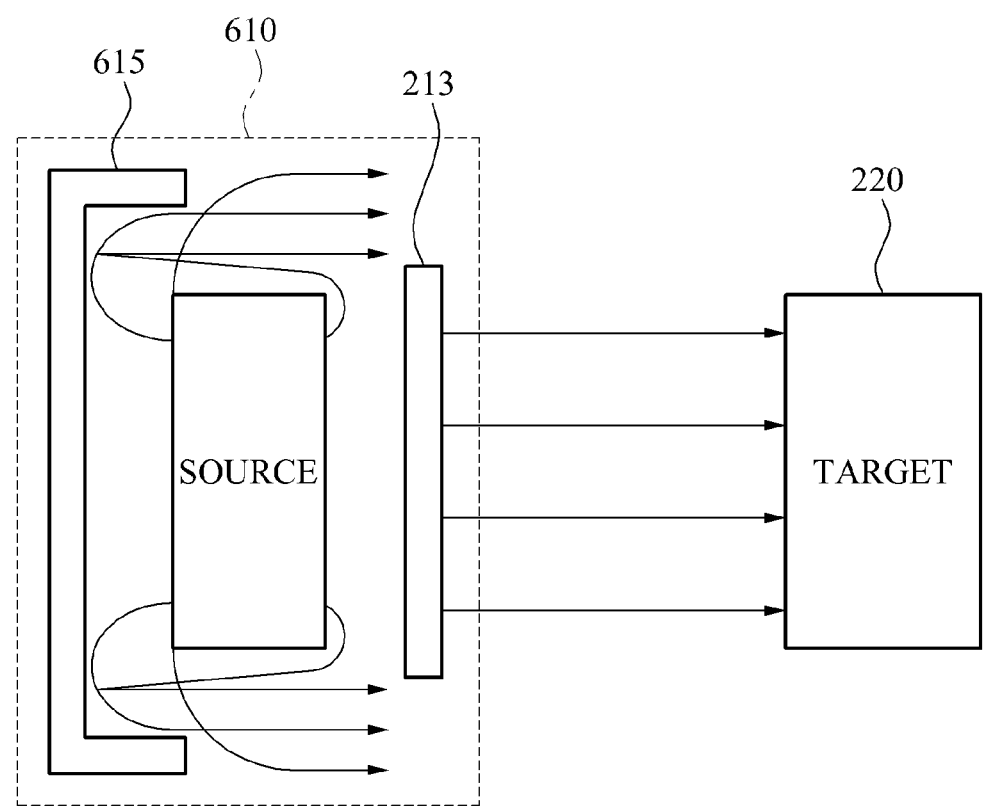
FIG. 6 is a diagram illustrating another example of a wireless power transmission apparatus.

FIG. 6 illustrates a wireless power transmission apparatus.

Referring to FIG. 6, wireless power transmission apparatus 610 includes a source unit 211, a near field focusing unit 213, and a near field controller 615. The source unit 211 and the near field focusing unit 213 of FIG. 6 may respectively have the same configuration as any of the source units 211 and the near field focusing units 213 of FIGS. 2 through 5.

The near field controller 615 may be designed to have a High Impedance Surface (HIS) characteristic. Thus, the near field controller 615 may minimize a change in a resonance frequency or a Q-factor of the source resonator by minimizing a ground effect.

For example, the HIS characteristic may be designed based on a resonance frequency of the source unit 211. For example, the near field controller 615 may be designed such that a magnetic field of the source unit 211 may have an in-phase characteristic. When the near field controller 615 has the HIS characteristic, the magnetic field generated by the source unit 211 may have the in-phase characteristic with respect to the near field controller 615. Thus, according to various examples, it is possible to minimize an influence on peripheral apparatuses, for example, apparatuses that are sensitive to the magnetic field.

As an example, the near field controller 615 may include side focusing units and a rear surface focusing unit. The side focusing units may control the direction of a side magnetic field of the source unit 211 such that the side magnetic field of the source unit 211 is focused on the target apparatus 220, as shown in FIG. 6. The rear surface focusing unit may control the direction of a rear surface magnetic field of the source unit 211 such that the rear surface magnetic field of the source unit 211 may be focused on the target apparatus 220, as shown in FIG. 6.

According to various examples, it is possible to focus a magnetic field that is initially radiated in an undesired direction during the wireless power transmission, towards a target apparatus. Thus, it is possible to increase the energy transmission efficiency and minimize an influence on peripheral apparatuses.

For example, a source resonator and/or a target resonator may be configured as a helix coil structured resonator, a spiral coil structured resonator, a meta-structured resonator, and the like.

All the materials may have a unique magnetic permeability (Mµ) and a unique permittivity (epsilon ∈). The magnetic permeability indicates a ratio between a magnetic flux density that occurs with respect to a given magnetic field in a corresponding material and a magnetic flux density that occurs with respect to the given magnetic field in a vacuum state. The magnetic permeability and the permittivity may determine a propagation constant of a corresponding material in a given frequency or a given wavelength. An electromagnetic characteristic of the corresponding material may be determined based on the magnetic permeability and the permittivity. For example, a material that has a magnetic permeability or a permittivity that has not been found in nature and that is artificially designed is referred to as a metamaterial. The metamaterial may be disposed in a resonance state even in a relatively large wavelength area or a relatively low frequency area. For example, even though a material size rarely varies, the metamaterial may be easily disposed in the resonance state.

Figure 7:
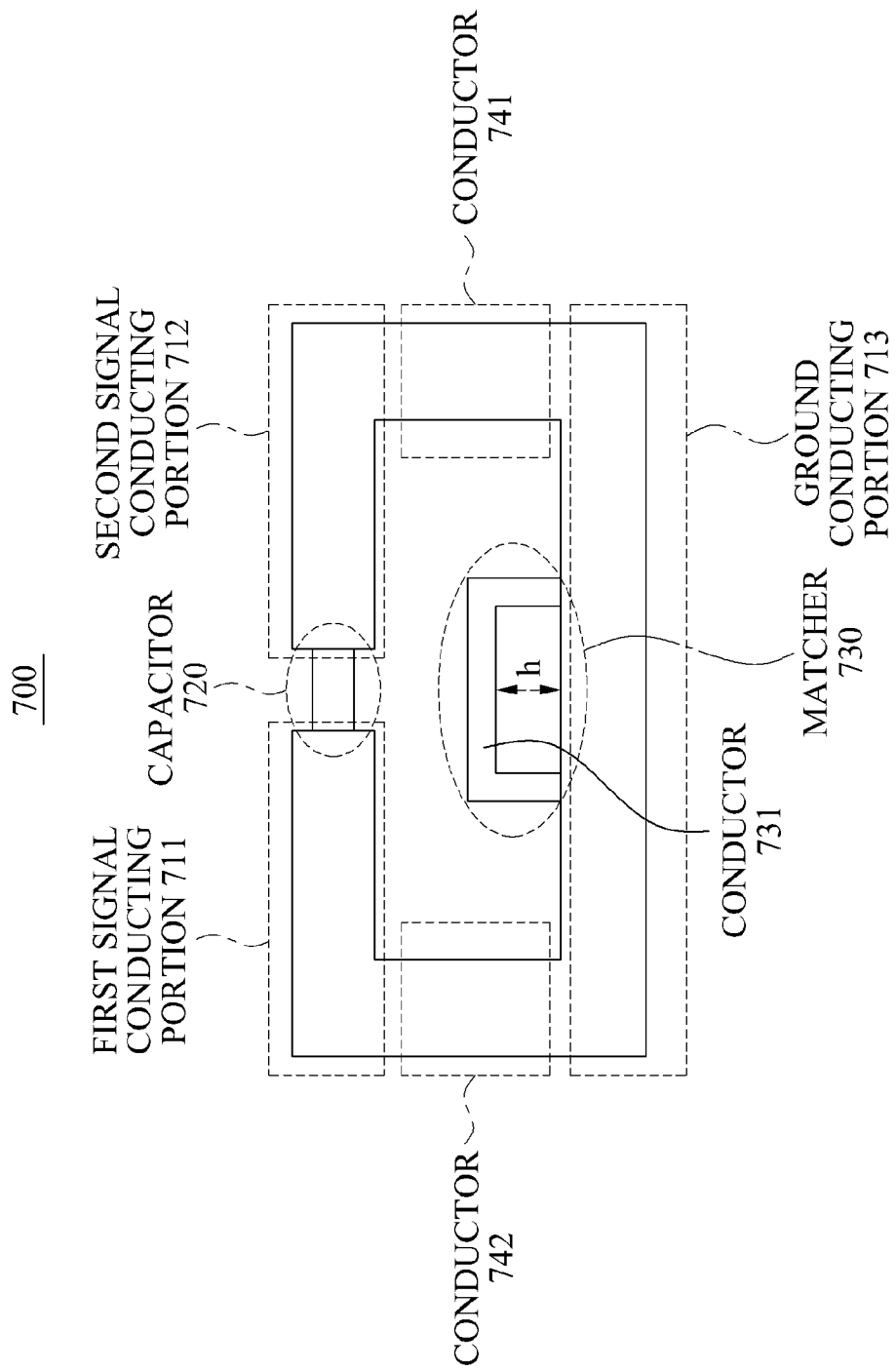
FIG. 7 through FIG. 13 are diagrams illustrating various examples of a resonator structure.

FIG. 7 illustrates an example of a two-dimensional (2D) view of a resonator.

Referring to FIG. 7, resonator 700 includes a transmission line, a capacitor 720, a matcher 730, and conductors 741 and 742. In this example, the transmission line includes a first signal conducting portion 711, a second signal conducting portion 712, and a ground conducting portion 713.

For example, the capacitor 720 may be inserted in series between the first signal conducting portion 711 and the second signal conducting portion 712, and an electric field may be confined within the capacitor 720. Generally, the transmission line may include at least one conductor in an upper portion of the transmission line and at least one conductor in a lower portion of the transmission line. Current may flow through the at least one conductor disposed in the upper portion of the transmission line, and the at least one conductor disposed in the lower portion of the transmission may be electrically grounded. For example, a conductor disposed in an upper portion of the transmission line may be separated into and thereby be referred to as the first signal conducting portion 711 and the second signal conducting portion 712. A conductor disposed in the lower portion of the transmission line may be referred to as the ground conducting portion 713.

As shown in FIG. 7, the transmission line may include the first signal conducting portion 711 and the second signal conducting portion 712 in the upper portion of the transmission line, and may include the ground conducting portion 713 in the lower portion of the transmission line. The first signal conducting portion 711 and the second signal conducting portion 712 may be disposed to face the ground conducting portion 713. Current may flow through the first signal conducting portion 711 and the second signal conducting portion 712.

One end of the first signal conducting portion 711 may be shorted to the conductor 742, and another end of the first signal conducting portion 711 may be connected to the capacitor 720. One end of the second signal conducting portion 712 may be grounded to the conductor 741, and another end of the second signal conducting portion 712 may be connected to the capacitor 720. Accordingly, the first signal conducting portion 711, the second signal conducting portion 712, the ground conducting portion 713, and the conductors 741 and 742 may be connected to each other, and the resonator 700 may have an electrically closed-loop structure. The phrase "loop structure" may include a polygonal structure, for example, a circular structure, a rectangular structure, and the like. "Having a loop structure" indicates a circuit that is electrically closed.

The capacitor 720 may be inserted into an intermediate portion of the transmission line. For example, the capacitor 720 may be inserted into a space between the first signal conducting portion 711 and the second signal conducting portion 712. As an example, the capacitor 720 may have the shape of a lumped element, a distributed element, and the like. For example, a distributed capacitor having the shape of the distributed element may include zigzagged conductor lines and a dielectric material that has a relatively high permittivity between the zigzagged conductor lines.

When the capacitor 720 is inserted into the transmission line, the resonator 700 may have a property of a metamaterial. The metamaterial indicates a material having a predetermined electrical property that has not been discovered in nature, and thus, may have an artificially designed structure. An electromagnetic characteristic of all the materials existing in nature may have a unique magnetic permeability or a unique permittivity. Most materials may have a positive magnetic permeability or a positive permittivity. In the case of most materials, a right hand rule may be applied to an electric field, a magnetic field, and a pointing vector, and thus, the corresponding materials may be referred to as right handed materials (RHMs). However, the metamaterial has a magnetic permeability or a permittivity absent in nature, and thus, may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the capacitor 720 inserted as the lumped element is determined, the resonator 700 may have the characteristic of the metamaterial. Because the resonator 700 may have a negative magnetic permeability by appropriately adjusting the capacitance of the capacitor 720, the resonator 700 may also be referred to as an MNG resonator. Various criteria may be applied to determine the capacitance of the capacitor 720. For example, the various criteria may include a criterion for enabling the resonator 700 to have the characteristic of the metamaterial, a criterion for enabling the resonator 700 to have a negative magnetic permeability in a target frequency, a criterion for enabling the resonator 700 to have a zeroth order resonance characteristic in the target frequency, and the like. For example, the capacitance of the capacitor 720 may be determined based on at least one criterion.

The resonator 700, also referred to as the MNG resonator 700, may have a zeroth order resonance characteristic that has, as a resonance frequency, a frequency when a propagation constant is "0". For example, a zeroth order resonance characteristic may be a frequency transmitted through a line or a medium that has a propagation constant of "0." Because the resonator 700 may have the zeroth order resonance characteristic, the resonance frequency may be independent with respect to a physical size of the MNG resonator 700. By appropriately designing the capacitor 720, the MNG resonator 700 may sufficiently change the resonance frequency. Accordingly, the physical size of the MNG resonator 700 may not be changed.

In a near field, the electric field may be concentrated on the capacitor 720 inserted into the transmission line. Accordingly, due to the capacitor 720, the magnetic field may become dominant in the near field. The MNG resonator 700 may have a relatively high Q-factor using the capacitor 720 of the lumped element, and thus, it is possible to enhance an efficiency of power transmission. For example, the Q-factor may indicate a level of an ohmic loss or a ratio of a reactance with respect to a resistance in the wireless power transmission. Accordingly, the efficiency of the wireless power transmission may increase according to an increase in the Q-factor.

The MNG resonator 700 may include a matcher 730 for impedance matching. The matcher 730 may adjust the strength of a magnetic field of the MNG resonator 700. An impedance of the MNG resonator 700 may be determined by the matcher 730. Current may flow into and/or out of the MNG resonator 700 via a connector. The connector may be connected to the ground conducting portion 713 or the matcher 730. For example, power may be transferred through coupling without using a physical connection between the connector and the ground conducting portion 713 or the matcher 730.

For example, as shown in FIG. 7, the matcher 730 may be positioned within the loop formed by the loop structure of the resonator 700. The matcher 730 may adjust the impedance of the resonator 700 by changing the physical shape of the matcher 730. For example, the matcher 730 may include the conductor 731 for the impedance matching in a location that is separated from the ground conducting portion 713 by a distance h. The impedance of the resonator 700 may be changed by adjusting the distance h.

Although not illustrated in FIG. 7, a controller may be provided to control the matcher 730. For example, the matcher 730 may change the physical shape of the matcher 730 based on a control signal generated by the controller. For example, the distance h between the conductor 731 of the matcher 730 and the ground conducting portion 713 may increase or decrease based on the control signal. Accordingly, the physical shape of the matcher 730 may be changed and the impedance of the resonator 700 may be adjusted. The controller may generate the control signal based on various factors, which is described later.

As shown in FIG. 7, the matcher 730 may be configured as a passive element such as the conductor 731. As another example, the matcher 730 may be configured as an active element such as a diode, a transistor, and the like. When the active element is included in the matcher 730, the active element may be driven based on the control signal generated by the controller, and the impedance of the resonator 700 may be adjusted based on the control signal. For example, a diode that is a type of the active element may be included in the matcher 730. The impedance of the resonator 700 may be adjusted based on whether the diode is in an ON state or in an OFF state.

Although not illustrated in FIG. 7, a magnetic core may pass through the MNG resonator 700. For example, the magnetic core may perform a function of increasing a power transmission distance.

Figure 8:
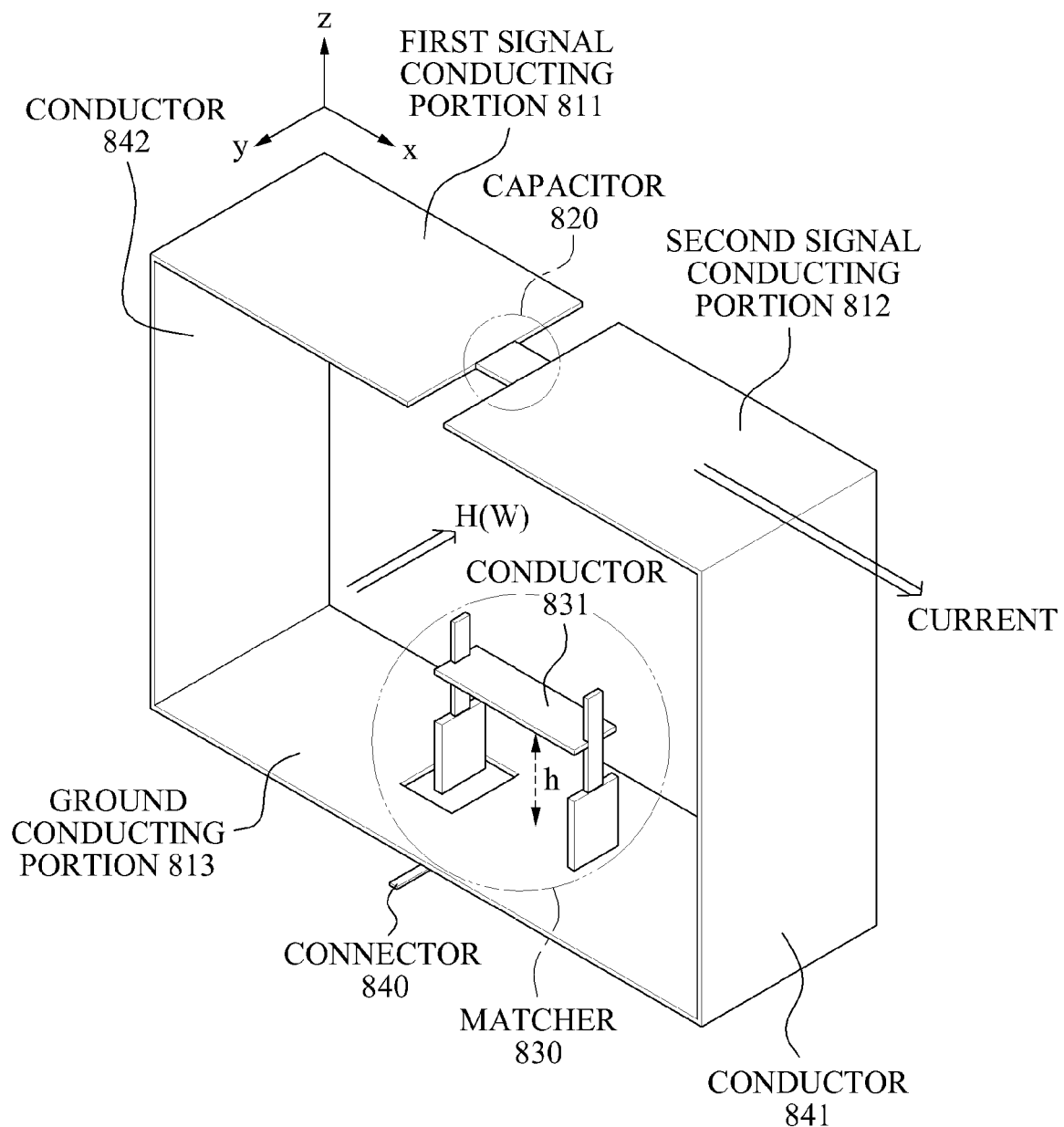

FIG. 8 illustrates a three-dimensional (3D) view of a resonator.

Referring to FIG. 8, resonator 800 includes a transmission line and a capacitor 820. The transmission line may include a first signal conducting portion 811, a second signal conducting portion 812, and a ground conducting portion 813. The capacitor 820 may be inserted in series between the first signal conducting portion 811 and the second signal conducting portion 812 of the transmission link, and an electric field may be confined within the capacitor 820.

As shown in FIG. 8, the transmission line may include the first signal conducting portion 811 and the second signal conducting portion 812 in an upper portion of the resonator 800, and may include the ground conducting portion 813 in a lower portion of the resonator 800. The first signal conducting portion 811 and the second signal conducting portion 812 may be disposed to face the ground conducting portion 813. For example, current may flow in an x direction through the first signal conducting portion 811 and the second signal conducting portion 812. Due to the current, a magnetic field H(W) may be formed in a −y direction. Alternatively, unlike the diagram of FIG. 8, the magnetic field H(W) may be formed in a +y direction.

One end of the first signal conducting portion 811 may be shorted to the conductor 842, and another end of the first signal conducting portion 811 may be connected to the capacitor 820. One end of the second signal conducting portion 812 may be grounded to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other such that the resonator 800 has an electrically closed-loop structure. The term "loop structure" may include a polygonal structure, for example, a circular structure, a rectangular structure, and the like. "Having a loop structure" refers to a circuit that is electrically closed.

As shown in FIG. 8, the capacitor 820 may be inserted between the first signal conducting portion 811 and the second signal conducting portion 812. The capacitor 820 may be inserted into a space between the first signal conducting portion 811 and the second signal conducting portion 812. For example, the capacitor 820 may have a shape of a lumped element, a distributed element, and the like. For example, a distributed capacitor that has the shape of the distributed element may include zigzagged conductor lines and a dielectric material that has a relatively high permittivity between the zigzagged conductor lines.

As the capacitor 820 is inserted into the transmission line, the resonator 800 may have a property of a metamaterial.

When a capacitance of the capacitor inserted as the lumped element is appropriately determined, the resonator 800 may have the characteristic of the metamaterial. Because the resonator 800 may have a negative magnetic permeability by appropriately adjusting the capacitance of the capacitor 820, the resonator 800 may also be referred to as an MNG resonator. Various criteria may be applied to determine the capacitance of the capacitor 820. For example, the various criteria may include a criterion for enabling the resonator 800 to have the characteristic of the metamaterial, a criterion for enabling the resonator 800 to have a negative magnetic permeability in a target frequency, a criterion enabling the resonator 800 to have a zeroth order resonance characteristic in the target frequency, and the like. For example, the capacitance of the capacitor 820 may be determined based on at least one criterion.

The resonator 800, also referred to as the MNG resonator 800, may have a zeroth order resonance characteristic that has, as a resonance frequency, a frequency when a propagation constant is "0". Because the resonator 800 may have the zeroth order resonance characteristic, the resonance frequency may be independent with respect to a physical size of the MNG resonator 800. By appropriately designing the capacitor 820, the MNG resonator 800 may sufficiently change the resonance frequency. Accordingly, the physical size of the MNG resonator 800 may not be changed.

Referring to the MNG resonator 800 of FIG. 8, in a near field, the electric field may be concentrated on the capacitor 820 inserted into the transmission line. Accordingly, due to the capacitor 820, the magnetic field may become dominant in the near field. For example, because the MNG resonator 800 having the zeroth-order resonance characteristic may have characteristics similar to a magnetic dipole, the magnetic field may become dominant in the near field. A relatively small amount of the electric field formed due to the insertion of the capacitor 820 may be concentrated on the capacitor 820, and thus, the magnetic field may become further dominant.

Also, the MNG resonator 800 may include a matcher 830 for impedance matching. The matcher 830 may adjust the strength of magnetic field of the MNG resonator 800. An impedance of the MNG resonator 800 may be determined by the matcher 830. Current may flow into and/or out of the MNG resonator 800 via a connector 840. The connector 840 may be connected to the ground conducting portion 813 or the matcher 830.

For example, as shown in FIG. 8, the matcher 830 may be positioned within the loop formed by the loop structure of the resonator 800. The matcher 830 may adjust the impedance of the resonator 800 by changing the physical shape of the matcher 830. For example, the matcher 830 may include the conductor 831 for the impedance matching in a location that is separated from the ground conducting portion 813 by a distance h. The impedance of the resonator 800 may be changed by adjusting the distance h.

Although not illustrated in FIG. 8, a controller may be provided to control the matcher 830. For example, the matcher 830 may change the physical shape of the matcher 830 based on a control signal generated by the controller. For example, the distance h between the conductor 831 of the matcher 830 and the ground conducting portion 813 may increase or decrease based on the control signal. Accordingly, the physical shape of the matcher 830 may be changed and the impedance of the resonator 800 may be adjusted. The distance h between the conductor 831 of the matcher 830 and the ground conducting portion 813 may be adjusted using a variety of schemes. As one example, a plurality of conductors may be included in the matcher 830 and the distance h may be adjusted by adaptively activating one of the conductors. As another example, the distance h may be adjusted by adjusting the physical location of the conductor 831 up and down. The distance h may be controlled based on the control signal of the controller. The controller may generate the control signal using various factors. An example of the controller generating the control signal is described later.

As shown in FIG. 8, the matcher 830 may be configured as a passive element such as the conductor 831. As another example, the matcher 830 may be configured as an active element such as a diode, a transistor, and the like. When the active element is included in the matcher 830, the active element may be driven based on the control signal generated by the controller, and the impedance of the resonator 800 may be adjusted based on the control signal. For example, a diode that is a type of the active element may be included in the matcher 830. For example, the impedance of the resonator 800 may be adjusted based on whether the diode is in an ON state or in an OFF state.

Although not illustrated in FIG. 8, a magnetic core may pass through the resonator 800 configured as the MNG resonator. The magnetic core may perform a function of increasing a power transmission distance.

Figure 9:
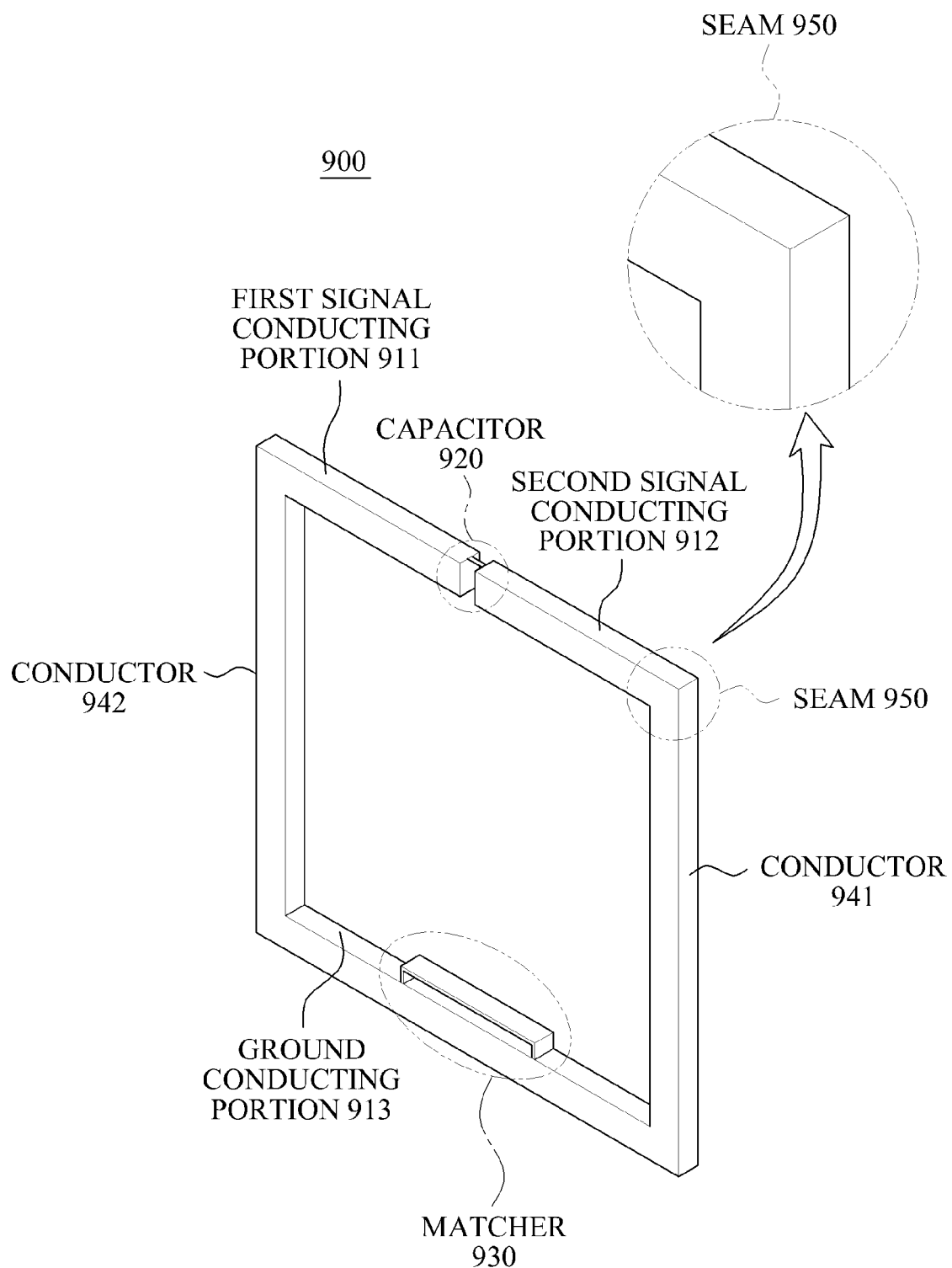

FIG. 9 illustrates an example of a bulky-type resonator for wireless power transmission.

Referring to FIG. 9, in resonator 900 a first signal conducting portion 911 and a second signal conducting portion 912 may be integrally formed instead of being separately manufactured and later connected to each other. Similarly, the second signal conducting portion 912 and the conductor 941 may also be integrally manufactured.

When the second signal conducting portion 912 and the conductor 941 are separately manufactured and then are connected to each other, a loss of conduction may occur due to a seam 950. As an example, the second signal conducting portion 912 and the conductor 941 may be seamlessly connected to each other. Accordingly, it is possible to decrease a conductor loss caused by the seam 950. As another example, the second signal conducting portion 912 and a ground conducting portion 913 may be seamlessly and integrally manufactured. Similarly, the first signal conducting portion 911 and the ground conducting portion 913 may be seamlessly and integrally manufactured. Accordingly, it should be understood, any of the components of the resonator may be seamlessly manufactured with adjacent components of the resonator to prevent seams from being formed.

Referring to FIG. 9, a type of a seamless connection connecting at least two partitions into an integrated form is referred to as a bulky type.

Figure 10:
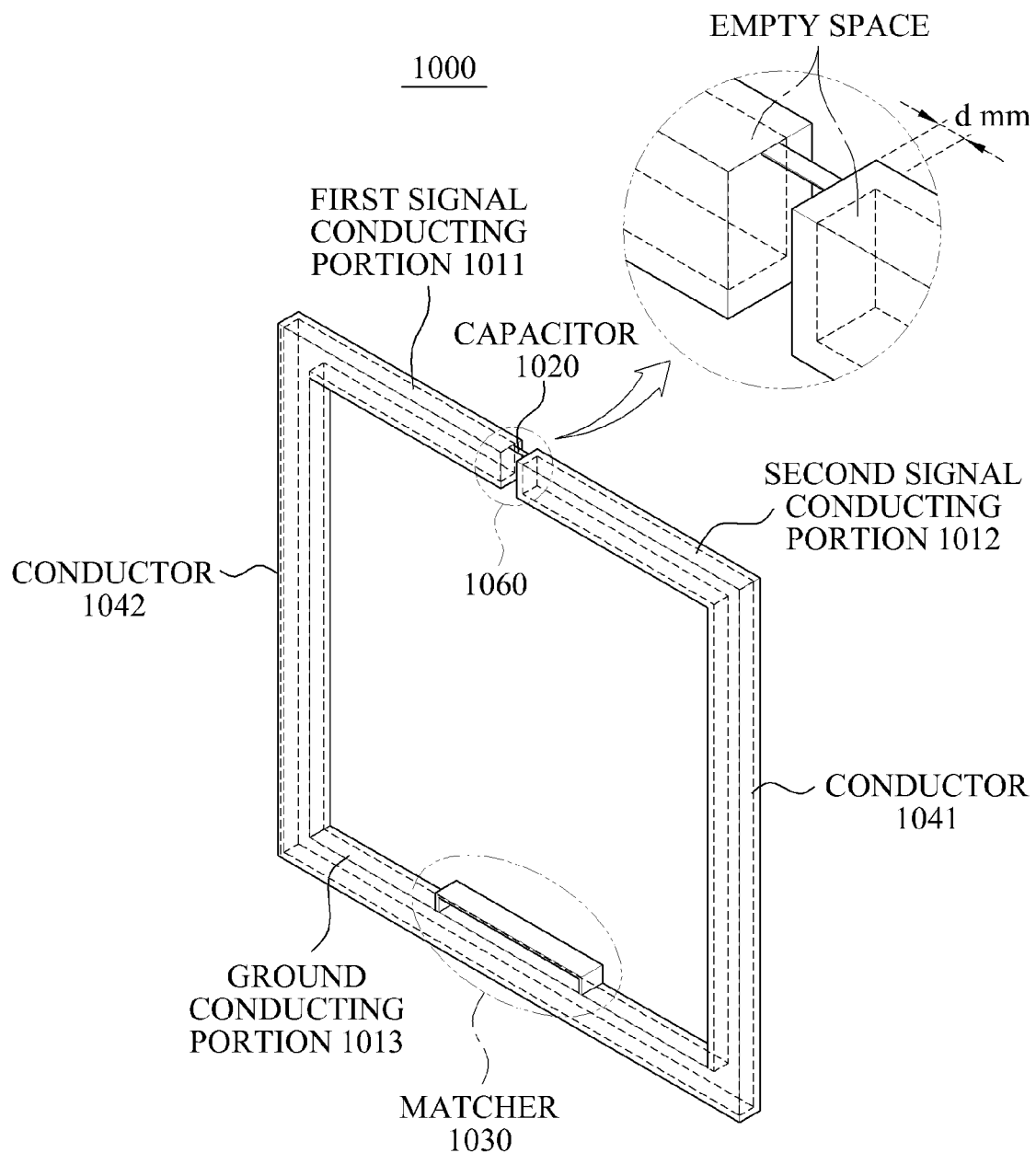

FIG. 10 illustrates an example of a hollow-type resonator for wireless power transmission.

Referring to FIG. 10, in resonator 1000 each of a first signal conducting portion 1011, a second signal conducting portion 1012, a ground conducting portion 1013, and conductors 1041 and 1042 of the resonator 1000 configured as the hollow type may include an empty or hollow space inside.

In a given resonance frequency, an active current may be modeled to flow in only a portion of the first signal conducting portion 1011 instead of the entire the first signal conducting portion 1011, only a portion of the second signal conducting portion 1012 instead of the entire second signal conducting portion 1012, only a portion of the ground conducting portion 1013 instead of the entire ground conducting portion 1013, and/or only a portion of the conductors 1041 and 1042 instead of the entire conductors 1041 and 1042. For example, when a depth of each of the first signal conducting portion 1011, the second signal conducting portion 1012, the ground conducting portion 1013, and the conductors 1041 and 1042 is significantly deeper than a corresponding skin depth in the given resonance frequency, it may be ineffective. The significantly deeper depth may increase a weight or manufacturing costs of the resonator 1000.

Accordingly, in the given resonance frequency, the depth of each of the first signal conducting portion 1011, the second signal conducting portion 1012, the ground conducting portion 1013, and the conductors 1041 and 1042 may be determined based on the corresponding skin depth of each of the first signal conducting portion 1011, the second signal conducting portion 1012, the ground conducting portion 1013, and the conductors 1041 and 1042. When each of the first signal conducting portion 1011, the second signal conducting portion 1012, the ground conducting portion 1013, and the conductors 1041 and 1042 has an appropriate depth deeper than a corresponding skin depth, the resonator 1000 may become light, and manufacturing costs of the resonator 1000 may also decrease.

For example, as shown in FIG. 10, the depth of the second signal conducting portion 1012 may be determined as "d" mm and d may be determined according to $$d = \frac{1}{\sqrt{\pi f \mu \sigma}}.$$

In this example, f denotes a frequency, μ denotes a magnetic permeability, and σ denotes a conductor constant. For example, when the first signal conducting portion 1011, the second signal conducting portion 1012, the ground conducting portion 1013, and the conductors 1041 and 1042 are made of a copper and have a conductivity of $5.8 \times 10^7$ siemens per meter ($S \cdot m^{-1}$), the skin depth may be approximately 0.6 mm with respect to 10 kHz of the resonance frequency and the skin depth may be approximately 0.006 mm with respect to 100 MHz of the resonance frequency.

Figure 11:
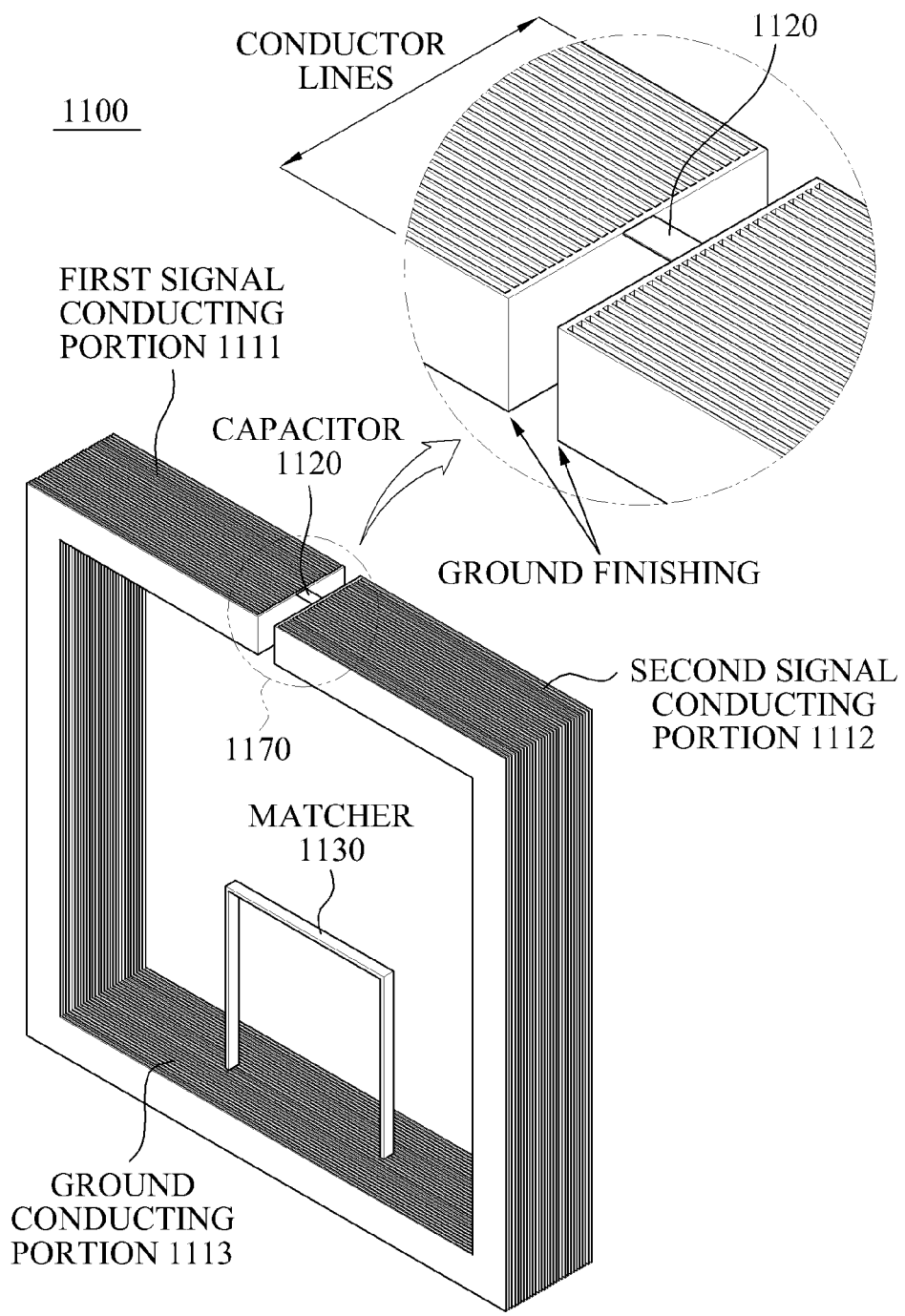

FIG. 11 illustrates an example of a resonator for wireless power transmission using a parallel-sheet.

Referring to FIG. 11, the parallel-sheet may be applicable to each of a first signal conducting portion 1111 and a second signal conducting portion 1112 included in the resonator 1100.

Each of the first signal conducting portion 1111 and the second signal conducting portion 1112 may not be a perfect conductor, and thus, may have a resistance. Due to the resistance, an ohmic loss may occur. The ohmic loss may decrease a Q-factor and also decrease a coupling effect.

By applying the parallel-sheet to each of the first signal conducting portion 1111 and the second signal conducting portion 1112, it is possible to decrease the ohmic loss, and to increase the Q-factor and the coupling effect. Referring to portion 1170 indicated by a circle, when the parallel-sheet is applied, each of the first signal conducting portion 1111 and the second signal conducting portion 1112 may include a plurality of conductor lines. The plurality of conductor lines may be disposed in parallel, and may be shorted at an end portion of each of the first signal conducting portion 1111 and the second signal conducting portion 1112.

As described above, when the parallel-sheet is applied to each of the first signal conducting portion 1111 and the second signal conducting portion 1112, the plurality of conductor lines may be disposed in parallel. Accordingly, a sum of resistances having the conductor lines may decrease. Consequently, the resistance loss may decrease, and the Q-factor and the coupling effect may increase.

Figure 12:
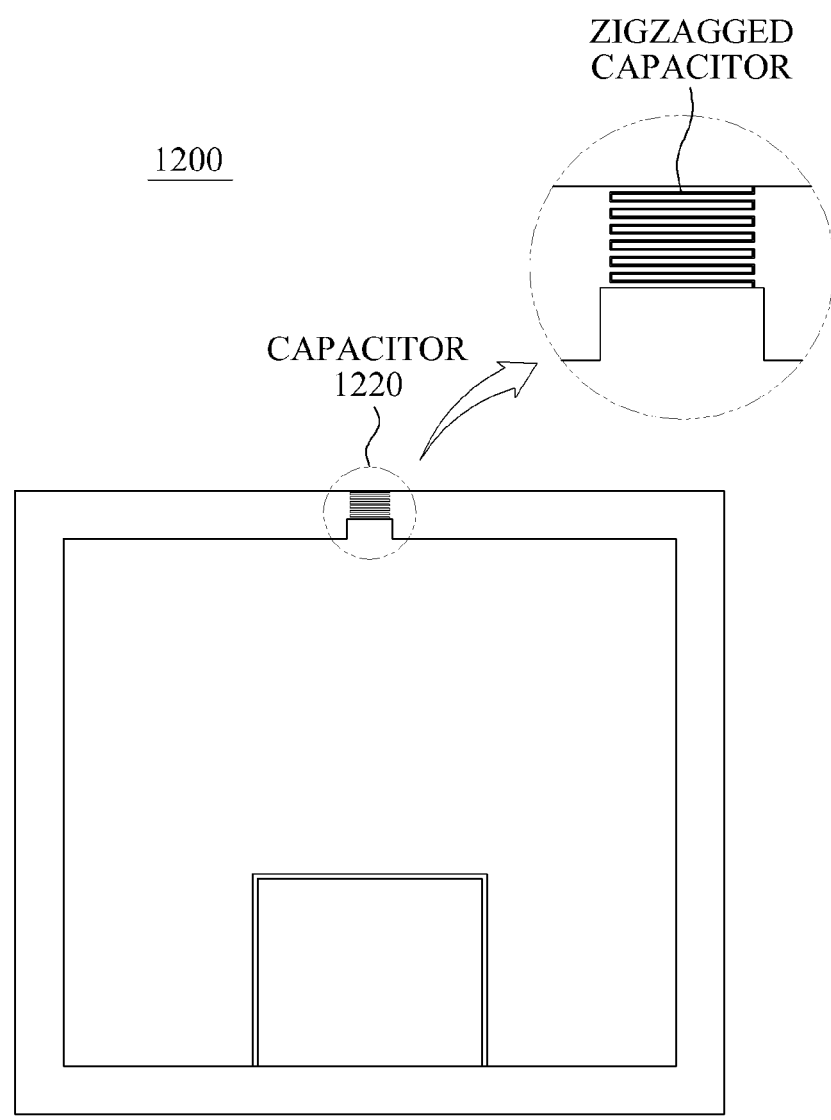

FIG. 12 illustrates an example of a resonator for wireless power transmission that includes a distributed capacitor.

Referring to FIG. 12, a capacitor 1220 included in resonator 1200 for wireless power transmission may be a distributed capacitor. A capacitor as a lumped element may have a relatively high equivalent series resistance (ESR). For example, using the capacitor 1220 as a distributed element, it is possible to decrease the ESR. A loss caused by the ESR may decrease a Q-factor and a coupling effect.

As shown in FIG. 12, the capacitor 1220 as the distributed element may have a zigzagged structure. For example, the capacitor 1220 as the distributed element may be configured as a conductive line and a conductor having the zigzagged structure.

As shown in FIG. 12, by employing the capacitor 1220 as the distributed element, it is possible to decrease the loss occurring due to the ESR. In addition, by disposing a plurality of capacitors as lumped elements, it is possible to decrease the loss that occurs due to the ESR. Because a resistance of each of the capacitors as the lumped elements decreases through a parallel connection, active resistances of parallel-connected capacitors as the lumped elements may also decrease and the loss occurring due to the ESR may decrease. For example, by employing ten capacitors of 1 pF instead of using a single capacitor of 10 pF, it is possible to decrease the loss caused by the ESR.

Figure 13A:
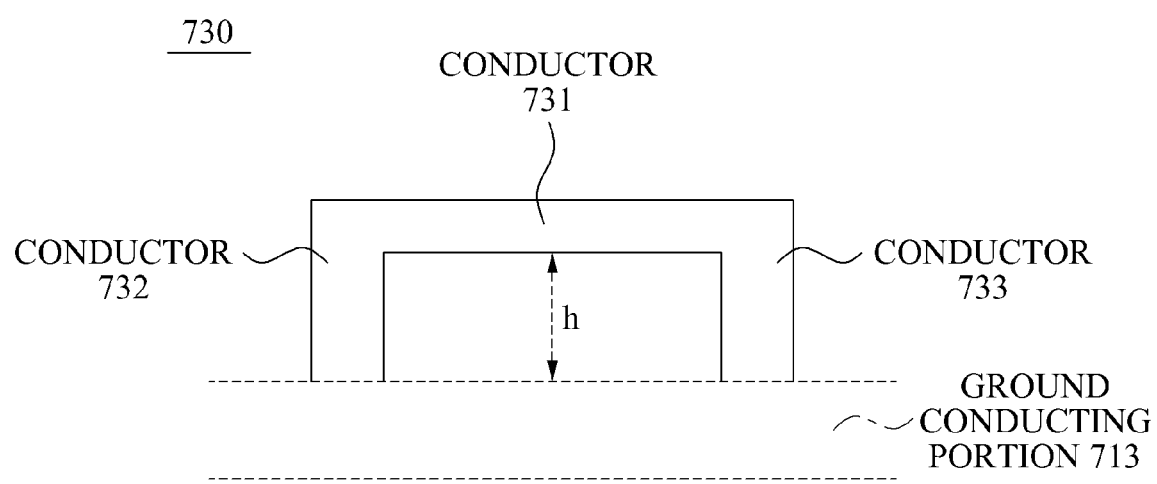
Figure 13B:
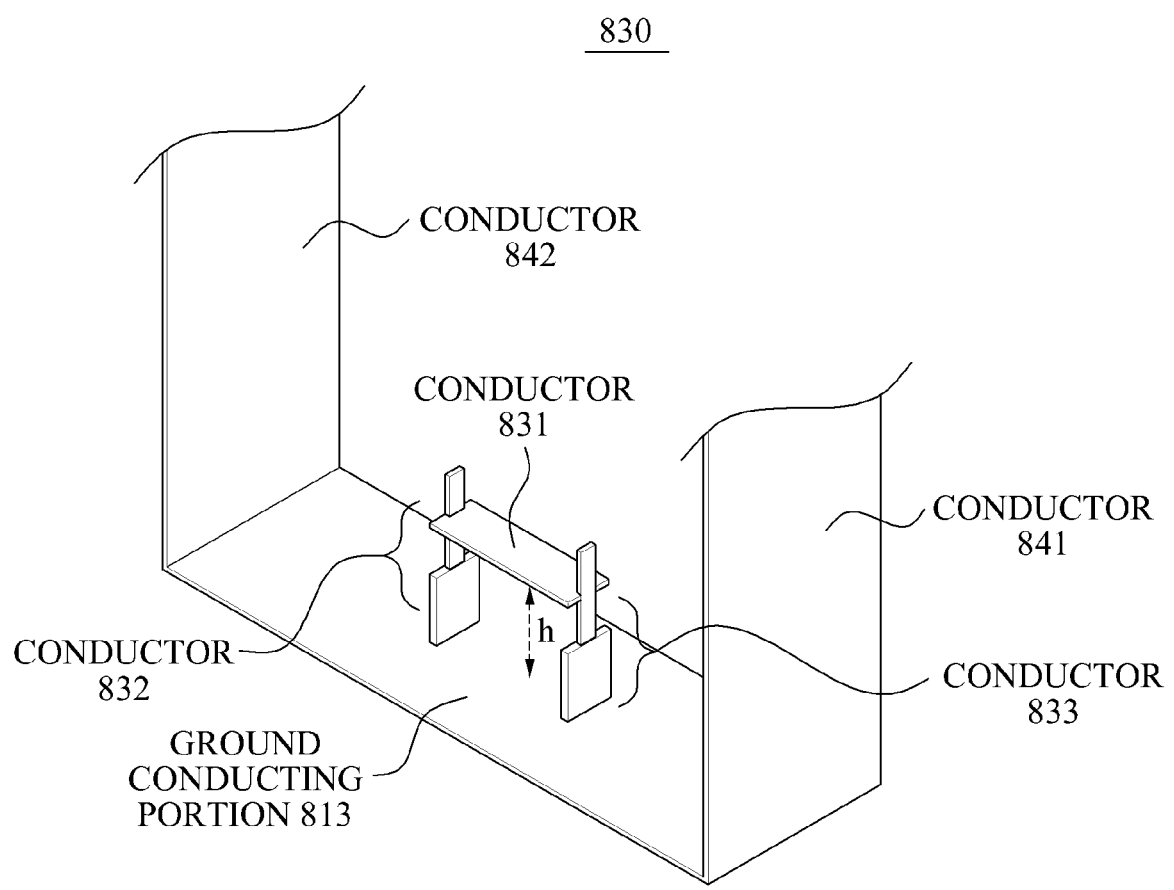

FIG. 13A illustrates an example of the matcher 730 that is used in the resonator 700 provided in the 2D view of FIG. 7, and FIG. 13B illustrates an example of the matcher 830 used in the resonator 800 provided in the 3D view of FIG. 8.

FIG. 13A illustrates a portion of the 2D resonator including the matcher 730, and FIG. 13B illustrates a portion of the 3D resonator of FIG. 8 including the matcher 830.

Referring to FIG. 13A, the matcher 730 includes a conductor 731, a conductor 732, and a conductor 733. The conductors 732 and 733 may be connected to a ground conducting portion 713 and the conductor 731. The impedance of the 2D resonator may be determined based on a distance h between the conductor 731 and the ground conducting portion 713. The distance h between the conductor 731 and the ground conducting portion 713 may be controlled by the controller. For example, the distance h between the conductor 731 and the ground conducting portion 713 may be adjusted using a variety of schemes. For example, the variety of schemes may include a scheme of adjusting the distance h by adaptively activating one of the conductors 731, 732, and 733, a scheme of adjusting the physical location of the conductor 731 up and down, and the like.

Referring to FIG. 13B, the matcher 830 includes a conductor 831, a conductor 832, and a conductor 833. The conductors 832 and 833 may be connected to a ground conducting portion 813 and the conductor 831. The conductors 832 and 833 may be connected to the ground conducting portion 813 and the conductor 831. The impedance of the 3D resonator may be determined based on a distance h between the conductor 831 and the ground conducting portion 813. The distance h between the conductor 831 and the ground conducting portion 813 may be controlled by the controller. Similar to the matcher 730 included in the 2D structured resonator, for example, the distance h between the conductor 831 and the ground conducting portion 813 may be adjusted using a variety of schemes. For example, the variety of schemes may include a scheme of adjusting the distance h by adaptively activating one of the conductors 831, 832, and 833, a scheme of adjusting the physical location of the conductor 831 up and down, and the like.

Although not illustrated in FIGS. 13A and 13B, the matcher may include an active element. A scheme of adjusting an impedance of a resonator using the active element may be similar as described above. For example, the impedance of the resonator may be adjusted by changing a path of current flowing through the matcher using the active element.

Figure 14:
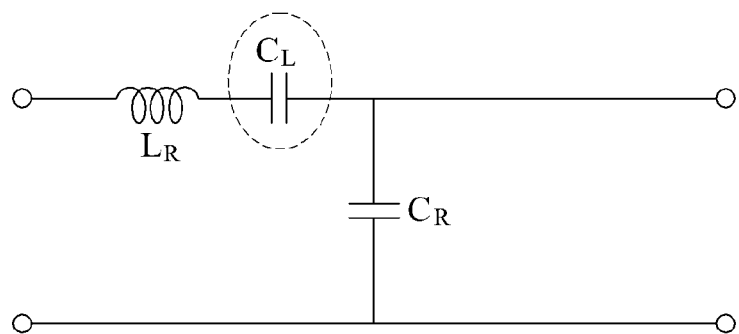
FIG. 14 is a diagram illustrating an example of an equivalent circuit of the resonator for a wireless power transmission of FIG. 7.

FIG. 14 illustrates an example of an equivalent circuit of the resonator 700 of FIG. 7.

The resonator 700 may be modeled as the equivalent circuit of FIG. 14. In the equivalent circuit of FIG. 14, $C_L$ denotes a capacitor that is inserted in a form of a lumped element in the middle of the transmission line of FIG. 7.

In this example, the resonator 700 may have a zeroth resonance characteristic. For example, when a propagation constant is "0", the resonator 700 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \qquad \text{[Equation 2]}$$

In Equation 2, MZR denotes a Mµ zero resonator.

Referring to Equation 2, the resonance frequency $\omega_{MZR}$ of the resonator 700 may be determined by $L_R/C_L$. A physical size of the resonator 700 and the resonance frequency $\omega_{MZR}$ may be independent with respect to each other. Because the physical sizes are independent with respect to each other, the physical size of the resonator 700 may be sufficiently reduced.

As described herein, a wireless power transmission apparatus may reduce an influence on peripheral apparatuses using near field focusing.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmission apparatus, comprising:
a source resonator disposed between a substrate and a material and configured to transmit wireless power through a magnetic field to a target apparatus;
the substrate; and
the material, having a High Impedance Surface (HIS) based on a resonance frequency of the source resonator, wherein
the substrate and the material are configured to focus a near field of the magnetic field onto the target apparatus, the magnetic field being radiated in an omni-direction from the source resonator.

2. The wireless power transmission apparatus of claim 1, wherein the substrate comprises a meta-superstrate that has a negative refractive index.

3. The wireless power transmission apparatus of claim 1, wherein the substrate comprises a Mu Near Zero (MNZ) superstrate or Epsilon Near Zero (ENZ) superstrate that has a beam forming characteristic.

4. The wireless power transmission apparatus of claim 1, wherein the magnetic field of the source resonator has a resonance frequency that is in phase with a resonance frequency of the substrate.

5. The wireless power transmission apparatus of claim 1, wherein the material comprises a U-shaped element comprising:
a side portion configured to control a direction of a side magnetic field of the source resonator; and
a rear surface portion configured to control a direction of a rear surface magnetic field of the source resonator.

6. A source resonator configured to increase wireless energy transmission efficiency, the source resonator comprising:
a resonator disposed between a substrate and a material and configured to wirelessly transmit a power signal to a target resonator through a magnetic field;
the substrate; and
the material that has a High Impedance Surface (HIS) based on a resonance frequency of the source unit, wherein
the substrate and the material are configured to focus a near field of the magnetic field in a direction of a target resonator such that incident waves of the power signal that are not travelling in the direction of the target resonator are redirected towards the target resonator.

7. The source resonator of claim 6, wherein the substrate comprises a meta-superstrate that has a negative refractive index that enables the incident waves to be redirected towards the target resonator.

8. The source resonator of claim 6, wherein the substrate comprises a Mu Near Zero (MNZ) superstrate or Epsilon Near Zero (ENZ) superstrate that has a beam forming characteristic that enables the incident waves to be redirected towards the target resonator.

9. The source resonator of claim 6, further comprising a material operating at a resonance frequency that is in phase with a resonance frequency of the substrate.

10. The source resonator of claim 9, wherein the material comprises a side portion configured to control a direction of a side magnetic field of the source unit, and a rear surface portion configured to control a direction of a rear surface magnetic field of the source unit.

11. The source resonator of claim 6, further comprising a metal conductor configured to adjust a strength of the magnetic field of the source resonator via impedance matching.

12. The source resonator of claim 11, wherein the metal conductor is further configured to adjust the impedance of the source resonator by changing a physical shape of a circuit that the metal conductor is part of.

13. The source resonator of claim 12, wherein the metal conductor is configured to change the physical shape of the circuit that the metal conductor is part of based on a control signal generated by a controller.

14. The source resonator of claim 13, further comprising a ground conducting portion, wherein the metal conductor is configured to adjust a distance between a conductor portion of the circuit and a ground conducting portion based on the control signal.

* * * * *